United States Patent
Wang et al.

(10) Patent No.: US 11,727,569 B2
(45) Date of Patent: Aug. 15, 2023

(54) TRAINING A CNN WITH PSEUDO GROUND TRUTH FOR CT ARTIFACT REDUCTION

(71) Applicant: Rensselaer Polytechnic Institute, Troy, NY (US)

(72) Inventors: Ge Wang, Loudonville, NY (US); Lars Arne Gjesteby, Cohasset, MA (US); Hongming Shan, Troy, NY (US)

(73) Assignee: Rensselaer Polytechnic Institute, Troy, NC (US)

(*) Notice: Subject to any disclaimer, the term of this patent is extended or adjusted under 35 U.S.C. 154(b) by 50 days.

(21) Appl. No.: 17/404,361

(22) Filed: Aug. 17, 2021

(65) Prior Publication Data

US 2021/0374961 A1  Dec. 2, 2021

Related U.S. Application Data

(63) Continuation of application No. 16/201,186, filed on Nov. 27, 2018, now Pat. No. 11,120,551.

(60) Provisional application No. 62/590,966, filed on Nov. 27, 2017.

(51) Int. Cl.
*G06T 7/20* (2017.01)
*G06T 7/00* (2017.01)
*G06T 5/00* (2006.01)

(52) U.S. Cl.
CPC ............ *G06T 7/0014* (2013.01); *G06T 5/002* (2013.01); *G06T 5/005* (2013.01); *G06T 2207/10081* (2013.01); *G06T 2207/20081* (2013.01); *G06T 2207/20084* (2013.01); *G06T 2207/30052* (2013.01)

(58) Field of Classification Search
CPC ....... G06T 5/002; G06T 5/005; G06T 7/0014; G06T 2207/10081; G06T 2207/20081; G06T 2207/30052; G06T 2207/20084
See application file for complete search history.

(56) References Cited

U.S. PATENT DOCUMENTS

| 2007/0195923 A1* | 8/2007 | Netsch | G06T 11/005 378/4 |
| 2011/0038516 A1 | 2/2011 | Koehler et al. | |
| 2016/0117850 A1* | 4/2016 | Jin | A61B 6/5258 382/131 |
| 2017/0004636 A1 | 1/2017 | Nett et al. | |

(Continued)

*Primary Examiner* — Congvan Tran
(74) *Attorney, Agent, or Firm* — Murtha Cullina LLP; Anthony P. Gangemi (57) ABSTRACT

Training a CNN with pseudo ground truth for CT artifact reduction is described. An estimated ground truth apparatus is configured to generate an estimated ground truth image based, at least in part, on an initial CT image that includes an artifact. Feature addition circuitry is configured to add a respective feature to each of a number, N, copies of the estimated ground truth image to create the number, N, initial training images. A computed tomography (CT) simulation circuitry is configured to generate a plurality of simulated training CT images based, at least in part, on at least some of the N initial training images. An artifact reduction circuitry is configured to generate a plurality of input training CT images based, at least in part, on the simulated training CT images. A CNN training circuitry is configured to train the CNN based, at least in part, on the input training CT images and based, at least in part, on the initial training images.

13 Claims, 3 Drawing Sheets

(56) References Cited

U.S. PATENT DOCUMENTS

| | | | |
|---|---|---|---|
| 2018/0247434 A1* | 8/2018 | Qin | G06T 11/005 |
| 2019/0108441 A1* | 4/2019 | Thibault | G06T 11/003 |
| 2019/0325621 A1* | 10/2019 | Wang | A61B 5/00 |
| 2020/0138390 A1* | 5/2020 | Varlet | A61B 6/5223 |

* cited by examiner

TRAINING A CNN WITH PSEUDO GROUND TRUTH FOR CT ARTIFACT REDUCTION

CROSS REFERENCE TO RELATED APPLICATION(S)

This application is a continuation of and claims the benefit of U.S. Nonprovisional patent application Ser. No. 16/201,186, filed Nov. 27, 2018, that claims the benefit of U.S. Provisional Application No. 62/590,966, filed Nov. 27, 2017, the entire disclosures of which are hereby incorporated by reference as if disclosed herein in their entireties.

FIELD

The present disclosure relates to training a convolutional neural network (CNN), in particular to, training the CNN with a pseudo (i.e., estimated) ground truth for CT (computed tomography) artifact reduction.

BACKGROUND

Artifacts resulting from features, e.g., metal objects, have been a persistent problem in CT (computed tomography) images over the last four decades. One approach to overcome their effects is to replace corrupt projection data with values synthesized from an interpolation scheme. Another approach includes reprojection of a prior image. Existing correction methods, including for example, an interpolation- and normalization-based technique ("NMAR"), may not produce satisfactory results for some clinical applications. Residual image artifacts may remain in challenging cases and, in some instances, new artifacts can be introduced by the interpolation scheme itself. Thus, artifacts, e.g., metal artifacts, continue to be a major impediment, particularly in radiation and proton therapy planning as well as in orthopedic imaging.

Currently, artifacts, e.g., metal artifacts, in CT images continue to hinder clinical diagnosis. Although a number of artifact reduction techniques have been implemented over the past several years, challenges remain and sufficient image quality may not always be achieved. For example, radiation and proton therapy planning are particularly sensitive to errors in the CT images, since incorrect estimation of a treatment beam stopping power may result in under treatment and tumor recurrence or unnecessary radiation to the surrounding healthy tissues.

SUMMARY

In some embodiments, a method for computed tomography (CT) artifact reduction is provided. The method includes generating, by an estimated ground truth apparatus, an estimated ground truth image based, at least in part, on an initial CT image, the initial CT image including an artifact. The method further includes adding, by feature addition circuitry, a respective feature to each of a number, N, copies of the estimated ground truth image to create the number, N, initial training images. The method further includes generating, by a CT simulation circuitry, a plurality of simulated training CT images based, at least in part, on at least some of the N initial training images. Each of at least some of the plurality of simulated training CT images contains at least one respective simulated artifact. The method further includes generating, by artifact reduction circuitry, a plurality of input training CT images based, at least in part, on the simulated training CT images. The method further includes training, by a convolutional neural network (CNN) training circuitry, a CNN based, at least in part, on the input training CT images and based, at least in part, on the initial training images.

In some embodiments of the method, generating the estimated ground truth image includes generating, by the artifact reduction circuitry, an intermediate CT image based, at least in part, on the initial CT image, the intermediate CT image comprising a reduced artifact. The estimated ground truth image is generated based, at least in part, on the intermediate CT image.

In some embodiments, the method further includes extracting, by the feature addition circuitry, a number, M, training patches from each of at least some of the N initial training images. In these embodiments, the simulated training CT images are generated based, at least in part, on at least some of the M training patches.

In some embodiments, the method further includes validating, by the CNN training circuitry, the trained CNN based, at least in part, on the intermediate CT image. In some embodiments, the method may further include reducing, by the trained CNN, an actual artifact in an actual CT image. In some embodiments of the method, the artifact reduction circuitry corresponds to metal artifact reduction circuitry. In some embodiments of the method, the initial CT image is an output of a CT scanner configured to image an imaging object and the imaging object contains a metal implant.

In some embodiments, an apparatus for generating an estimated ground truth image includes an artifact reduction circuitry configured to receive an initial CT image and to generate an intermediate CT image based, at least in part, on the initial CT image. The initial CT image includes a major artifact. The intermediate CT image includes a reduced artifact. The estimated ground truth image is generated based, at least in part, on the intermediate CT image.

In some embodiments, the apparatus may further include filtering/denoising circuitry configured to at least one of filter and/or denoise the intermediate CT image. In some embodiments of the apparatus, the artifact reduction circuitry is metal artifact reduction circuitry configured to perform metal artifact reduction. In some embodiments of the apparatus, the filtering/denoising circuitry is configured to perform one or more of low-pass filtering, segmentation and/or regional averaging of the intermediate CT image to generate the estimated ground truth image. In some embodiments of the apparatus, the initial CT image is an actual CT image of an imaging object that contains a metal implant.

In some embodiments, a convolutional neural network (CNN) system includes an estimated ground truth apparatus, feature addition circuitry, a first computed tomography (CT) simulation circuitry and a CNN training circuitry. The estimated ground truth apparatus is configured to generate an estimated ground truth image based, at least in part, on an initial CT image. The initial CT image includes an artifact. The feature addition circuitry is configured to add a respective feature to each of a number, N, copies of the estimated ground truth image to create the number, N, initial training images. The first CT simulation circuitry is configured to generate a plurality of simulated training CT images based, at least in part, on at least some of the N initial training images. Each of at least some of the plurality of simulated training CT images contains at least one respective simulated artifact. The first artifact reduction circuitry is configured to generate a plurality of input training CT images based, at least in part, on the simulated training CT images. The CNN training circuitry is configured to train the CNN based, at least in part, on the input training CT images and based, at least in part, on the initial training images.

In some embodiments of the system, the estimated ground truth apparatus includes a second artifact reduction circuitry configured to generate an intermediate CT image based, at least in part, on the initial CT image. The intermediate CT image includes a reduced artifact. The estimated ground truth image is generated based, at least in part, on the intermediate CT image.

In some embodiments of the system, the feature addition circuitry is configured to extract a number, M, training patches from each of at least some of the N initial training images. The simulated training CT images are generated based, at least in part, on at least some of the M training patches. In some embodiments of the system, the CNN training circuitry is configured to validate the trained CNN based, at least in part, on the intermediate CT image. In some embodiments of the system, at least one of the first and second artifact reduction circuitry is metal artifact reduction circuitry configured to perform metal artifact reduction. In some embodiments of the system, the trained CNN is configured to reduce an actual artifact in an actual CT image. In some embodiments of the system, the initial CT image is an output of a CT scanner configured to image an imaging object, the imaging object containing a metal implant. In some embodiments of the system, the initial CT image is simulated based, at least in part, on a phantom image.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

There are a number of classes of artifact reduction (e.g., metal artifact reduction (MAR)) techniques, with projection completion being relatively widely developed. Generally, these techniques are configured to replace corrupt sinogram data in the artifact, e.g., metal, trace with data synthesized by an interpolation technique, reprojection from a prior image or a combination of both that includes normalization. One example technique is normalized metal artifact reduction ("NMAR"). Other classes of artifact reduction methods include scan acquisition improvement, physics-based pre-processing, iterative reconstruction and image postprocessing. While image postprocessing algorithms have had some success, they are more useful when combined with sinogram domain correction. The current clinical techniques may fall short in providing requisite image quality for the most demanding applications, particularly in radiation and proton therapy planning.

Deep learning may provide a solution to the long-standing artifact reduction problem. Deep learning, including for example convolutional neural networks (CNNs), has been successfully applied to medical image processing and analysis tasks. Generally, training a CNN includes providing ground truth artifact-free images that may be used as network labels (i.e., training images). Typically, a ground truth artifact-free image is configured to be identical to an input image except for an artifact present in the input image and that the CNN is to be trained to remove. Ground truth artifact-free images may not be available in some clinical cases. For example, it may not be possible to capture artifact free images of a patient who has a metal implant. As used herein, metal implants may include, but are not limited to, artificial joints, tooth fillings, venous clips, etc.

Generally, the present disclosure relates to generating a pseudo, i.e., estimated, ground truth image from a feature (i.e., artifact)-affected image. The generated estimated ground truth image may then be utilized to perform supervised learning. The estimated ground truth image is generated, based at least in part, on an initial CT image that may include an artifact (e.g., a metal artifact). In some situations, the artifact may be substantial, i.e., major. In some embodiments, an artifact reduction technique may be performed on the initial CT image to produce an intermediate CT image that includes a reduced artifact prior to generating the estimated ground truth image. The estimated ground truth image may then be utilized to train a CNN, for example, in situations where actual ground truth, artifact-free data is not available.

In an embodiment, the estimated ground truth image may be generated based, at least in part, on an initial CT image. The initial CT image may be output from a CT scanner or CT simulation circuitry. The estimated ground truth may be generated based, at least in part, on a feature (e.g., metal)-affected image by filtering, segmentation and region averaging. Features and/or nodules may then be randomly added to the estimated ground truth image to create a set of training images, as will be described in more detail below.

An artificial neural network (ANN) is a network of elements (e.g., nodes) configured to receive input, change their internal state (activation) according to that input, and produce output depending on the input and activation. The network is formed by connecting the output of selected nodes to the input of other nodes to form a directed, weighted graph. The weights as well as the functions that compute the activation can be modified by learning (e.g., training).

A deep neural network is an ANN that has a plurality of layers between the input and output layers. A relationship between the input and the output may be linear or non-linear. A convolutional neural network (CNN) is a type of deep, feed-forward ANN, that includes one or more convolutional layers with fully connected layers on top. A multilayer perceptron (MLP) is a type of feed-forward ANN that includes at least three layers of nodes and each node, except for the input nodes, uses a nonlinear activation function. An MLP may be trained using back propagation, a supervised learning technique. The multiple layers and non-linear activation of an MLP distinguish it from a linear perceptron. CNNs are a type of deep ANN that use a variation of multilayer perceptrons designed to use minimal preprocessing.

Deep learning is a type of machine learning technique that uses a cascade of a plurality of layers of nonlinear processing units for feature extraction and transformation. Each successive layer uses the output from the previous layer as input. Deep learning techniques learn in supervised (e.g., classification) and/or unsupervised (e.g., pattern analysis) manners. Deep learning algorithms learn multiple levels of representations that correspond to different levels of abstraction. In other words, deep-learning methods are representation-learning methods with multiple levels of representation, obtained by composing simple but non-linear modules that each transform the representation at one level into a representation at a higher, slightly more abstract level. With the composition of enough such transformations, very complex functions can be learned.

Generally, this disclosure relates to a training a CNN with an estimated ground truth image for CT artifact reduction. An apparatus, method and/or system is configured to generate an estimated ground truth image based, at least in part, on an initial CT image that may contain an artifact. The apparatus, method and/or system is further configured to train a CNN based, at least in part, on the estimated ground truth image. For example, a plurality of features and/or nodules may be added to the estimated ground truth image to generate a plurality of training images that may then be used to train the CNN. The apparatus, method and/or system may be further configured to perform artifact reduction on the training images prior to provision to the CNN for training. Advantageously, the estimated ground truth image is configured to correspond to an actual imaging object, where a feature (e.g., metal)-free variant is not available, e.g., a patient.

In an embodiment, a convolutional neural network (CNN) system includes an estimated ground truth apparatus, feature addition circuitry, a first computed tomography (CT) simulation circuitry and a CNN training circuitry. The estimated ground truth apparatus is configured to generate an estimated ground truth image based, at least in part, on an initial CT image. The initial CT image includes an artifact. The feature addition circuitry is configured to add a respective feature to each of a number, N, copies of the estimated ground truth image to create the number, N, initial training images. The first CT simulation circuitry is configured to generate a plurality of simulated training CT images based, at least in part, on at least some of the N initial training images. Each of at least some of the plurality of simulated training CT images contains at least one respective simulated artifact. The first artifact reduction circuitry is configured to generate a plurality of input training CT images based, at least in part, on the simulated training CT images. The CNN training circuitry is configured to train the CNN based, at least in part, on the input training CT images and based, at least in part, on the initial training images. The trained CNN may then be used to reduce an actual artifact in an actual CT image.

Figure 1:
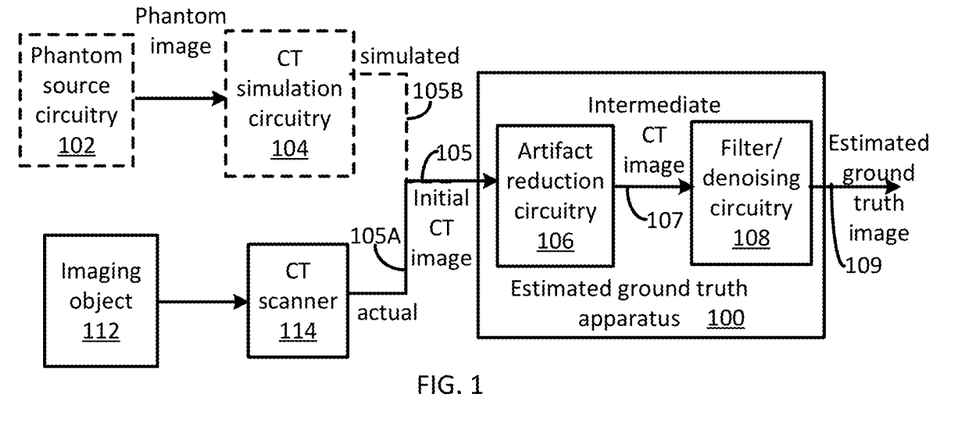
FIG. 1 illustrates a functional block diagram of an estimated ground truth apparatus consistent with several embodiments of the present disclosure.

FIG. 1 illustrates a functional block diagram 100 of an estimated ground truth apparatus consistent with several embodiments of the present disclosure. The estimated ground truth apparatus 100 includes artifact reduction circuitry 106 and filter/denoising circuitry 108. The estimated ground truth apparatus 100 is configured to receive an initial CT image 105. In one nonlimiting example, artifact reduction circuitry 106 may correspond to metal artifact reduction (MAR) circuitry.

In an embodiment, the initial CT image 105 may correspond to an actual CT image 105A. For example, the actual CT image 105A may be provided by and/or received from CT scanner 114. CT scanner 114 may be configured to capture projection data related to an imaging object 112 and to produce a corresponding actual CT image 105A. If the imaging object 112 contains an artifact-producing feature, e.g., a metal implant, then the actual CT image 105A may include an artifact, e.g., a metal artifact.

The actual CT image 105A may thus correspond to the imaging object 112 (e.g., a patient). For example, the patient may have one or more artifact-producing features, e.g., metal implants, as described herein. In this embodiment, estimated ground truth apparatus 100 is configured to generate the estimated ground truth image that may then be utilized for training a CNN, as described herein.

In another embodiment, the initial CT image 105 may correspond to a simulated CT image 105B. The simulated CT image may be provided by and/or received from CT simulation circuitry 104. For example, this embodiment may be configured to illustrate a proof of concept. In another example, this embodiment may support development of Artifact reduction circuitry 106 and/or filter/denoising circuitry 108. In this embodiment, a phantom source circuitry 102 may be configured to generate a phantom image. The phantom image may contain at least one metal feature corresponding to at least one metal implant. In one nonlimiting example, phantom source circuitry 102 may be configured to generate a Shepp-Logan type phantom. As is known, a Shepp-Logan phantom is a standard test image corresponding to a model of a human head that may be used in the development and testing of image reconstruction techniques. The Shepp-Logan phantom may incorporate radiation attenuation properties of a head and brain.

CT simulation circuitry 104 is configured to receive the phantom image from phantom source circuitry 102. CT simulation circuitry 104 is configured to generate the simulated CT image 105B based, at least in part, on the phantom image. The simulated CT image 105B is configured to contain a major artifact. In one nonlimiting example, the major artifact may correspond to a metal implant, as described herein. In one nonlimiting example, CT simulation circuitry 104 may correspond to "CatSim", a computer assisted tomography simulation environment (General Electric Global Research Center, Niskayuna, N.Y.). For example, CT simulation circuitry 104 may be configured to implement filtered back propagation (FBP) to generate the initial simulated CT image from the provided phantom image.

In these embodiments, an actual ground truth image may not be available. The phantom image may be configured to contain a metal artifact corresponding to a metal implant. The imaging object 112 may contain an artifact-producing feature, e.g., a metal implant. Thus, the initial CT image 105 may contain an artifact. The artifact may be substantial, i.e., may be a "major" artifact.

Estimated ground truth apparatus 100 is configured to receive the initial CT image 105. For example, Artifact reduction circuitry 106 may be configured to receive the initial CT image 105 (simulated 105B or actual 105A) from CT simulation circuitry 104 or CT scanner 114. Artifact reduction circuitry 106 is configured to generate an intermediate CT image 107 based, at least in part, on the initial CT image 105. The intermediate CT image 107 is configured to contain a reduced artifact (i.e., "minor artifact") compared to the major artifact contained in the initial CT image 105. In one nonlimiting example, artifact reduction circuitry 106 may be configured to implement a normalized metal artifact reduction (NMAR) technique. The NMAR technique includes segmenting metal artifacts in the image domain by thresholding. A three-dimensional forward projection may be configured to identify the metal trace in an original projection. Prior to interpolation, the projections may be normalized based on a three-dimensional forward projection of a prior image. The prior image may be obtained, for example, by a multi-threshold segmentation of the initial image. The original raw data are divided by the projection data of the prior image and, after interpolation, denormalized again.

In other words, in the NMAR technique, artifact reduction circuitry 106 may be configured to obtain a metal image and a prior image based, at least in part, on the initial CT image by thresholding. Artifact reduction circuitry 106 may be configured to generate corresponding sinograms by forward projection. Artifact reduction circuitry 106 may be further configured to generate an initial sinogram corresponding to the initial CT image. The initial sinogram may then be normalized by dividing it by the corresponding prior sinogram. Artifact reduction circuitry 106 may then be configured to utilize metal projections to determine where data in the normalized sinogram are replaced by interpolation. The interpolated and normalized sinogram may then be denormalized by multiplying it with the sinogram of the prior image again. Artifact reduction circuitry 106 may then be configured to perform reconstruction on the denormalized sinogram to generate the intermediate CT image 107. Thus, Artifact reduction circuitry 106 may be configured to perform an initial correction via interpolation based, at least in part, on the initial CT image 105 to yield the intermediate simulated CT image 107. A corresponding intermediate CT image 107 is configured to have a reduced artifact compared to the initial CT image 105.

Filter/denoising circuitry 108 is configured to receive the intermediate CT image 107 and to generate an estimated ground truth image 109. Filter/denoising circuitry 108 may be configured to perform one or more of low-pass filtering, segmentation, regional averaging, etc., on the intermediate CT image 107. The estimated ground truth image 109 may then contain relatively few artifacts compared to the intermediate CT image 107 and to the initial CT image 105.

Thus, an estimated ground truth image may be generated by estimated ground truth apparatus 100 based, at least in part, on an initial CT image that includes an artifact (e.g., a metal artifact) corresponding to a feature (e.g., a metal feature). The estimated ground truth image is configured to contain relatively few and/or minor artifacts while the initial CT image may contain a relatively major artifact. In other words, the phantom image and/or the imaging object may to correspond to a patient with a metal implant.

The estimated ground truth image may then be utilized to generate a plurality of training CT images. The training CT images may then be utilized to train a CNN, as will be described in more detail below.

Figure 2A:
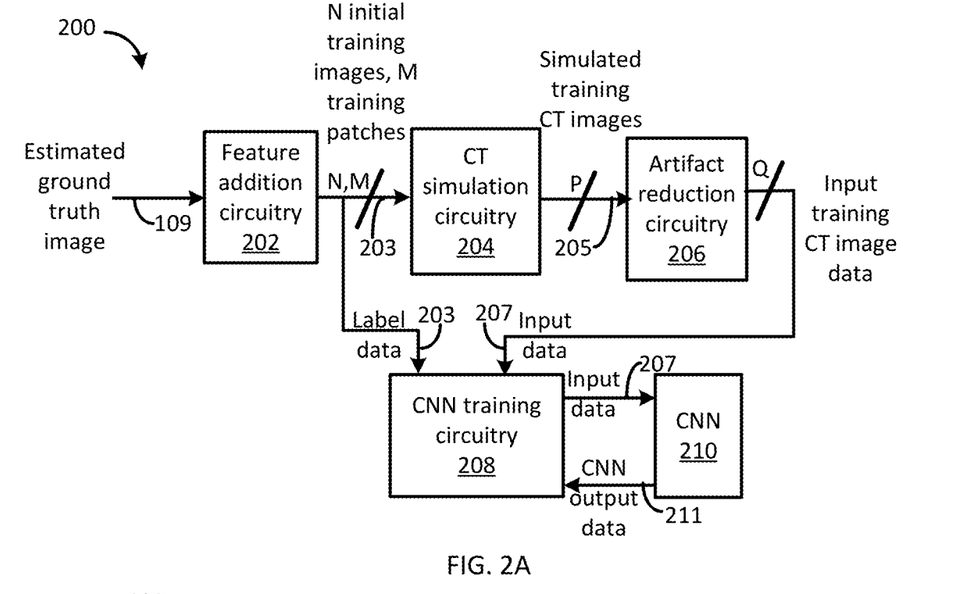
FIG. 2A illustrates a functional block diagram of a convolutional neural network (CNN) training system consistent with several embodiments of the present disclosure.

FIG. 2A illustrates a functional block diagram 200 of a CNN training system consistent with several embodiments of the present disclosure. CNN training system 200 includes feature addition circuitry 202, CT simulation circuitry 204, artifact reduction circuitry 206, CNN training circuitry 208 and CNN 210. Feature addition circuitry 202 is configured to receive an estimated ground truth image from, for example, estimated ground truth apparatus 100 of FIG. 1. Feature addition circuitry 202 is configured to create a number, N, initial training images based, at least in part, on the estimated ground truth image. For example, feature addition circuitry 202 may be configured to generate N copies of the estimated ground truth image. Feature addition circuitry 202 may then be configured to add at least one respective feature to each copy of the estimated ground truth image. For example, a plurality of features and/or nodules may be randomly added to a plurality of copies of one estimated ground truth image to generate a relatively large number of initial training images. In one nonlimiting example, the large number may be on the order of 10,000. In this manner, feature addition circuitry 202 may be configured to generate N initial training images. In other words, based, at least in part, on one estimated ground truth image, a plurality of initial training images may be generated. The plurality of initial training images may be configured to correspond to imaging object 112 of FIG. 1.

In some embodiments, feature addition circuitry 202 may be further configured to extract a number, M, training patches from each of at least some initial training images. Each training patch corresponds to a portion of an initial training image. In one nonlimiting example, for an initial training image of size 512×512 pixels, one or more image patches of size 32×32 pixels may be extracted. Of course, training images of other sizes and/or patches of other sizes are fully contemplated herein. The M training patches, N initial training images and/or a combination thereof may then be utilized to train CNN 210, as described herein.

CT simulation circuitry 204 may be configured to receive N initial training images, M training patches for each of at least some of the N initial training images and/or a combination thereof. CT simulation circuitry 204 may then be configured to generate a number, e.g., P, simulated training CT images based, at least in part, on at least some of the N initial training images and/or based, at least in part, on at least some of the M training patches. The number P is less than or equal to N×M. In one nonlimiting example, P may be on the order of 10,000. Each of at least some of the simulated training CT images may contain at least one respective simulated artifact.

Artifact reduction circuitry 206 may be configured to receive the number, P, simulated training CT images 205. Artifact reduction circuitry 206 may then be configured to generate a plurality of input training CT images (i.e., input training CT image data 207). For example, Artifact reduction circuitry 206 may be configured to perform forward projection and/or reconstruction on the simulated training CT images to generate the input training CT image data. The input training CT image data may then correspond to input data 207 to CNN 210. Thus, input data 207 to CNN 210 corresponds to the estimated ground truth image with features and/or nodules added and after at least some artifact reduction operations. The input data 207 is configured to include a number, e.g., Q, of input training CT images generated based, at least in part, on one estimated ground truth image 109.

Thus, a plurality of initial training images and/or training patches may be generated by feature addition circuitry 202. The plurality (e.g., number P) of initial training images and/or training patches correspond to label data 203. A corresponding plurality of input training CT images and/or input training patches (i.e., input training CT image data) may be generated by artifact reduction circuitry 206 based, at least in part, on as few as one estimated ground truth image. The input training CT image data corresponds to input data 207. The label data 203 and input data 207 may then be provided to CNN training circuitry 208.

CNN training circuitry 208 is configured to manage training operations of CNN 210. Thus, CNN training circuitry 208 is configured to receive label data 203 and input data 207. Label data corresponds to training images and/or training patches generated based, at least in part, on the estimated ground truth image and with added features and/or nodules. CNN training circuitry 208 may then be configured to provide input data 207 to CNN 210 and to receive CNN output data 211 from CNN 210. CNN 210 is configured to generate CNN output data 211 based, at least in part, on input data 207. CNN training circuitry 208 may then be configured to adjust parameters associated with CNN 210 to minimize a difference between CNN output data 211 and label data 203. Thus, CNN 210 may be trained based, at least in part, on initial training images and/or training patches and based, at least in part, on input training CT image data. The training is meant to configure CNN 210 to output a CNN output CT image that corresponds to a CNN input CT image with artifacts, if any, reduced, minimized or removed. In other words, during training, artifact reduction circuitry 206 is configured to reduce artifacts (e.g., metal artifacts) in simulated training CT images. During normal operation, after training, artifact reduction circuitry may be configured to reduce artifacts in an actual initial CT image. An output of the artifact reduction circuitry may then be provided to CNN 210 as input data. CNN 210 may then be configured to further reduce artifacts and to provide CNN output data that corresponds to an actual CT image of an imaging object with, for example, metal implants present but with associated metal artifacts reduced.

In some embodiments, CNN training circuitry 208 may then be configured to validate trained CNN 210 based, at least in part, on intermediate CT images (i.e., output of artifact reduction circuitry 106) from estimated ground truth apparatus 100 of FIG. 1. Thus, CNN training circuitry 208 may be configured to provide input data to CNN 210, retrieve CNN output data and compare the CNN output data to the intermediate CT image data.

Thus, an estimated ground truth image may be generated based, at least in part, on an initial CT image that may include artifacts, e.g., metal artifacts. The initial CT image may correspond to an imaging object, e.g., patient, that contains at least one artifact producing feature, e.g., a metal implant. The estimated ground truth image may then correspond to the imaging object.

The estimated ground truth image may then be utilized to generate a plurality of initial training images and/or training patches that include respective features and/or nodules. The initial training images and/or training patches may then be used to train a CNN, e.g., CNN 210. The trained CNN may then be utilized to perform artifact reduction on actual CT image data. The actual CT image may be captured from the imaging object.

Figure 2B:
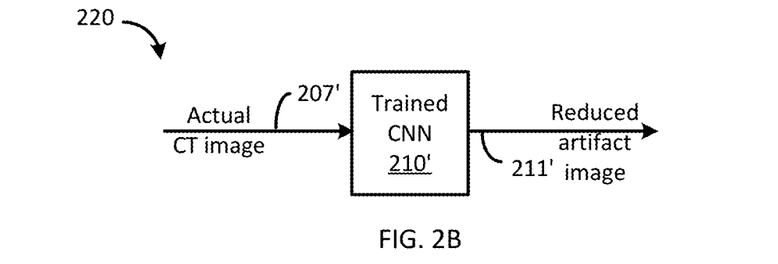
FIG. 2B illustrates a functional block diagram of a trained CNN system consistent with several embodiments of the present disclosure.

FIG. 2B illustrates a functional block diagram 220 of a trained CNN system consistent with several embodiments of the present disclosure. The trained CNN system 220 includes a trained CNN 210', trained as described herein. The trained CNN 210' is configured to receive an actual CT image 207'. The actual CT image 207' may be received, for example, from CT scanner 114 of FIG. 1, and may correspond to imaging object 112. The imaging object 112 may include a feature that results in actual CT image 207' containing an artifact. The trained CNN 201' is configured to provide as output a reduced artifact image 211' based, at least in part, on the actual CT image 207' input. Thus, the trained CNN may be used to perform artifact reduction on actual CT image data.

Thus, a convolutional neural network (CNN) may be trained for artifact reduction of computed tomography (CT) images without a genuine ground truth. In many clinical cases, CT scans of a patient without features, e.g., their metal implants, may not be available. For optimal CNN training for the purpose of artifact reduction, the label data should be identical to the input image except for the artifacts that need to be removed. An estimated ground truth may be generated from the feature-affected image. In an embodiment, a feature-affected image may be corrected by an interpolation technique (e.g., NMAR). The estimated ground truth is configured to contain relatively few artifacts and is configured to serve as the basis for the CNN labels. Nodules/features can be randomly added to this one estimated ground truth image to generate many different samples for training. These images have features, e.g., metal, added back in and are forward projected and reconstructed with NMAR to create the input for the CNN, which contain artifacts. Patches can be extracted from full size 512×512 images to increase the number of training samples. The input for the CNN may include many simulated training CT images that each contain one or more artifacts corresponding to the added features. The CNN may thus be trained on a relatively large number of training CT images generated based, at least in part, on one estimated ground truth image. The estimated ground truth image may be specific to the imaging object, enhancing accuracy of the artifact reduction.

Figure 3:
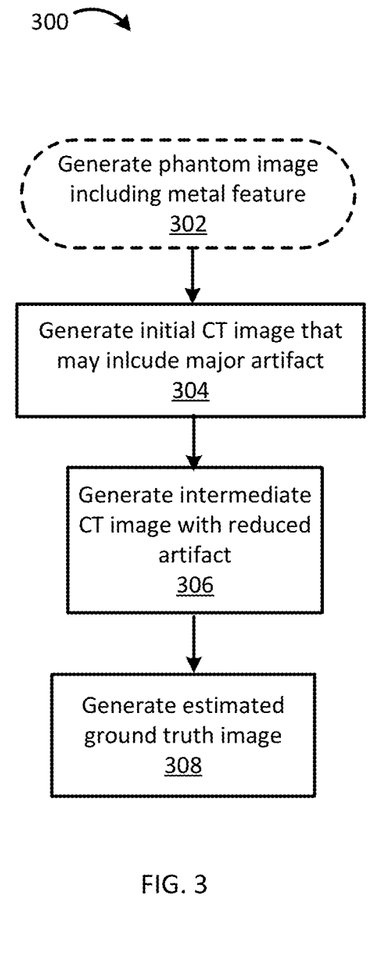
FIG. 3 is a flowchart of example estimated ground truth image generation operations consistent with several embodiments of the present disclosure.

FIG. 3 is a flowchart 300 of example estimated ground truth generation operations consistent with several embodiments of the present disclosure. In particular, flowchart 300 illustrates generating an estimated ground truth image based, at least in part, on an initial CT image that may include a metal artifact. The operations of flowchart 300 may be performed by, for example, estimated ground truth apparatus 100 (e.g., artifact reduction circuitry 106 and filter/denoising circuitry 108) of FIG. 1.

In some embodiments, operations of flowchart 300 may begin with generating a phantom image including a metal feature at operation 302. For example, the phantom image may correspond to a Shepp-Logan type phantom (i.e., simulating a human head). In these embodiments, estimated ground truth generation apparatus may be utilized for development purposes. Operation 304 may include generating an initial CT image that may include a major artifact. In an embodiment, the initial CT image may be generated based, at least in part, on the phantom image that includes a feature. In another embodiment, the initial CT image may be generated based, at least in part, on an actual CT image of an imaging object that includes a feature, e.g., a metal implant.

Operation 306 may include generating an intermediate CT image with a reduced artifact. For example, generating the intermediate CT image may include performing an initial correction via, for example, interpolation. Operation 308 may include generating an estimated ground truth image. For example, the estimated ground truth image may be generated based, at least in part, on the intermediate CT image. Operation 308 may include, for example, low-pass filtering, segmentation and/or regional averaging, etc.

Thus, an estimated ground truth image may be generated based, at least in part, on an initial CT image. The initial CT image may correspond to CT scanner output associated with an imaging object that may contain a feature, e.g., a metal implant, or a generated phantom image that includes a feature.

Figure 4:
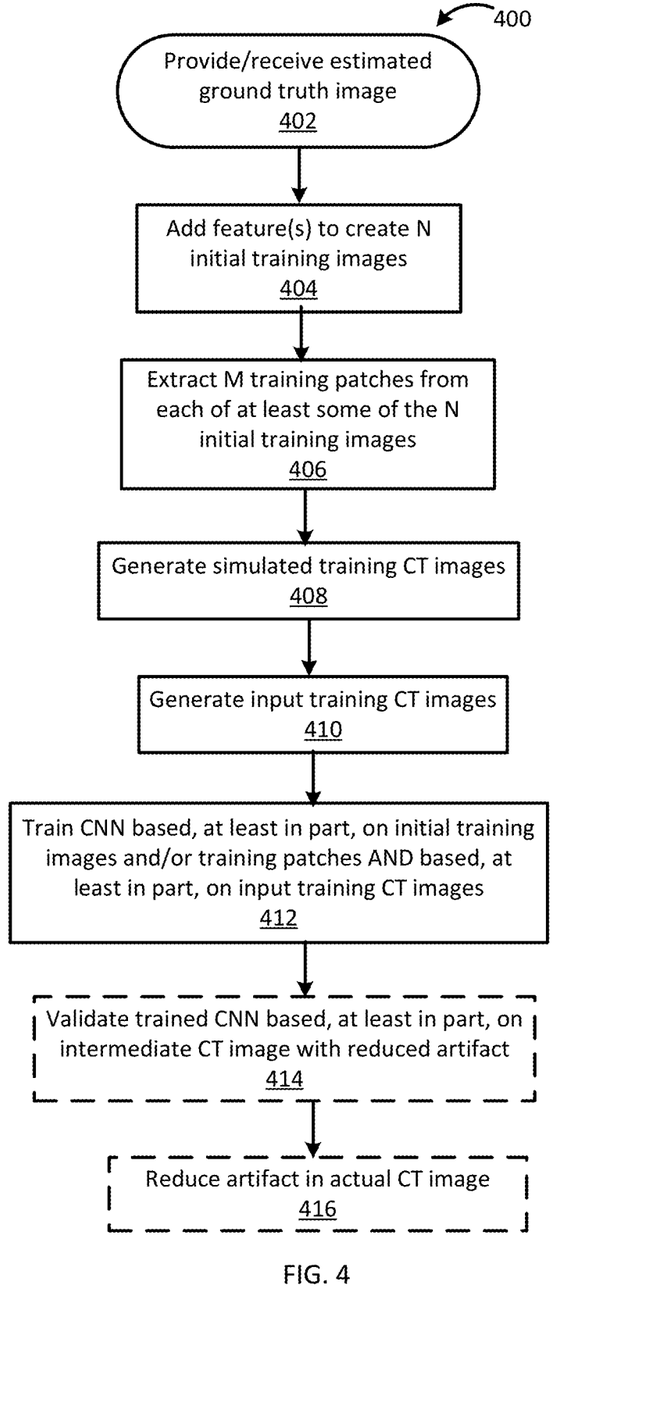
FIG. 4 is an example flowchart of convolutional neural network (CNN) operations consistent with several embodiments of the present disclosure.

FIG. 4 is an example flowchart 400 of convolutional neural network (CNN) operations consistent with several embodiments of the present disclosure. In particular, the flowchart 400 illustrates utilizing an estimated ground truth image to train a CNN. Flowchart 400 may further illustrate using the trained CNN for artifact reduction. The operations of flowchart 400 may be performed by, for example, CNN training system 200 (e.g., feature addition circuitry 202, CT simulation circuitry 204, artifact reduction circuitry 206, CNN training circuitry 208, CNN 210 and/or CNN 210') of FIGS. 2A and/or 2B.

Operations of flowchart 400 may begin with providing and/or receiving an estimated ground truth image at operation 402. For example, the estimated ground truth image may be received from and/or provided by an estimated ground truth apparatus. Operation 404 may include adding one or more features to create a number, N, initial training images. In some embodiments, operation 406 may include extracting a number, M, training patches from one or more of the initial training images. A plurality of simulated training CT images may be generated at operation 408. At least some of the plurality of simulated training CT images may contain at least one respective simulated artifact. A plurality of input training CT images may be generated at operation 410. The CNN may be trained based, at least in part, on initial training images and/or training patches and based, at least in part, on input training CT images at operation 412. In some embodiments, the trained CNN may be validated based, at least in part, on intermediate CT images with reduced artifacts at operation 414. In some embodiments, the trained CNN may be utilized to reduce an artifact in an actual CT image. For example, the actual CT image may contain an artifact associated with a feature contained in an imaging object.

Thus, a CNN and may be trained based, at least in part, on an estimated ground truth image. Advantageously, the estimated ground truth image is configured to correspond to an actual imaging object, e.g., a patient, where a feature-free (e.g., metal-free) variant is not available.

EXAMPLE

FIGS. 5A through 5E illustrate a reference CT image 502, an uncorrected CT image 504, a CNN input CT image 506 and two CNN output images 508, 510 for one example with a phantom image input. Shepp-Logan type phantoms were used for this example. The phantoms were provided to CT simulation circuitry, e.g., CatSim (CatSim, a computer-assisted tomography simulation environment, General Electric Global Research Center, Niskayuna, N.Y.). Two CNNs were trained with more than 10,000 patches extracted from the generated images to learn how to reduce metal artifacts. The networks were trained over 40 epochs with a learning rate starting at 1e-3 and decreasing by a factor of the square root of the epoch. The loss function of the CNN-MSE (mean squared error) network is optimized by the pixel-by-pixel mean squared error (MSE). The loss function of the CNN-WGAN (Wasserstein Generative Adversarial Network)-VGG (Visual Geometry Group) network is optimized in the WGAN framework by the perceptual loss in the feature space from a pretrained VGG network.

Figure 5A:
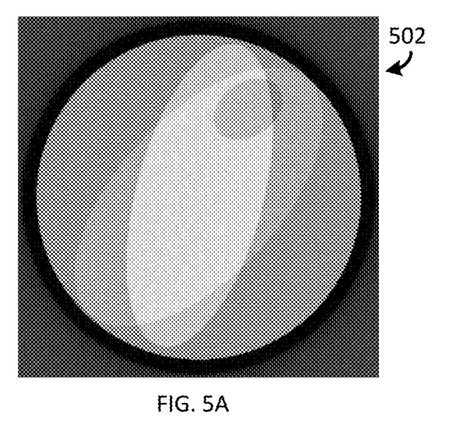
FIGS. 5A through 5E illustrate a reference CT image, an uncorrected CT image, a CNN input CT image and two CNN output images for one example with a phantom image input.
Figure 5B:
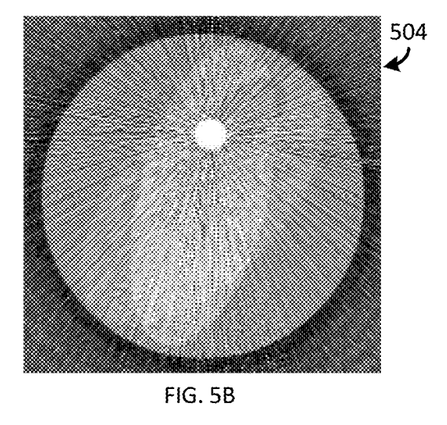
Figure 5C:
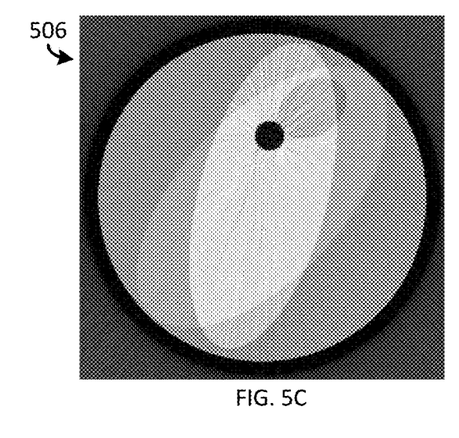
Figure 5D:
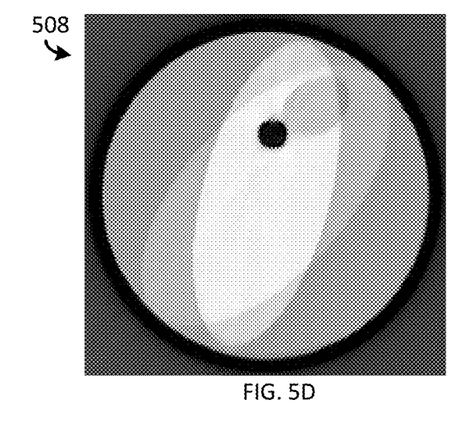
Figure 5E:
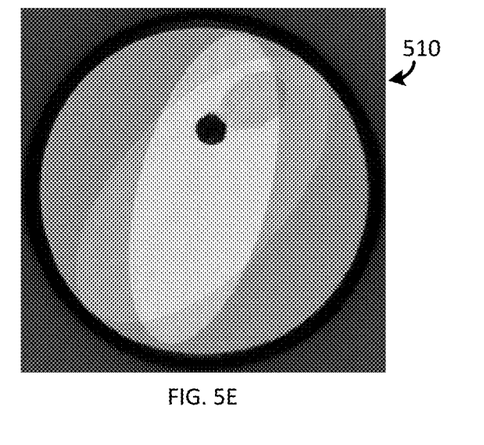

FIGS. 5A through 5E illustrate the results of the CNNs when the original NMAR-corrected image is the input for validation. FIG. 5A is a reference input 502. FIG. 5B is an uncorrected initial CT image 504. FIG. 5C is an intermediate CT image 506 (i.e., output of artifact reduction circuitry configured to implement NMAR). FIG. 5D is a CNN output 508 for a CNN configured to optimize a loss function with mean squared error (MSD). FIG. 5E is a CNN output 510 for a CNN configured for WGAN with a pre-trained VGG network.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors including one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a field-programmable gate array (FPGA), a programmable logic device (PLD), a complex programmable logic device (CPLD), a system on-chip (SoC), etc.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

What is claimed is:

1. A method for computed tomography (CT) artifact reduction, the method comprising:
receiving, by an estimated ground truth apparatus, an initial CT image, the initial CT image comprising a major artifact;
generating, by an artifact reduction circuitry, an intermediate CT image based, at least in part, on the initial CT image, the intermediate CT image comprising a reduced artifact; and
generating, by the estimated ground truth apparatus, an estimated ground truth image based, at least in part, on the intermediate CT image, the estimated ground truth image to be used for training an artificial neural network,
adding, by a feature addition circuitry, a respective feature to each of a number, N, copies of the estimated ground truth image to create the number, N, initial training images;
generating, by a CT simulation circuitry, a plurality of simulated training CT images based, at least in part, on at least some of the N initial training images, each of at least some of the plurality of simulated training CT images containing at least one respective simulated artifact; and training, by a convolutional neural network (CNN) training circuitry, a CNN based, at least in part, on the simulated training CT images and based, at least in part, on the initial training images.

2. The method of claim 1, further comprising at least one of filtering and/or denoising, by a filtering/denoising circuitry, the intermediate CT image, the filtered and/or denoised intermediate CT image corresponding to the estimated ground truth image.

3. The method of claim 2, wherein the filtering/denoising comprises one or more of low-pass filtering, segmentation and/or regional averaging of the intermediate CT image to generate the estimated ground truth image.

4. The method of claim 1, wherein the artifact reduction circuitry is metal artifact reduction circuitry and the generating the intermediate CT image comprises performing metal artifact reduction.

5. The method of claim 1, wherein the initial CT image is an actual CT image of an imaging object that contains a metal implant.

6. The method of claim 1, wherein the initial CT image is simulated based, at least in part, on a phantom image.

7. A convolutional neural network (CNN) training system comprising:
   an estimated ground truth apparatus configured to receive an initial CT image;
   an artifact reduction circuitry configured to generate an intermediate computed tomography (CT) image based, at least in part, on the initial CT image, the initial CT image comprising a major artifact, the intermediate CT image comprising a reduced artifact;
   the estimated ground truth apparatus, further configured to generate an estimated ground truth image based, at least in part, on the intermediate CT image, the estimated ground truth image for training an artificial neural network;
   a feature addition circuitry configured to add a respective feature to each of a number, N, copies of the estimated ground truth image to create the number, N, initial training images;
   a CT simulation circuitry configured to generate a plurality of simulated training CT images based, at least in part, on at least some of the N initial training images, each of at least some of the plurality of simulated training CT images containing at least one respective simulated artifact; and
   a convolutional neural network (CNN) training circuitry configured to train a CNN based, at least in part, on the simulated training CT images and based, at least in part, on the initial training images.

8. The system of claim 7, further comprising a filtering/denoising circuitry configured to at least one of filter and/or denoise the intermediate CT image, the filtered and/or denoised intermediate CT image corresponding to the estimated ground truth image.

9. The system of claim 8, wherein the filtering/denoising circuitry is configured to perform one or more of low-pass filtering, segmentation and/or regional averaging of the intermediate CT image to generate the estimated ground truth image.

10. The system of claim 7, wherein the artifact reduction circuitry is metal artifact reduction circuitry configured to perform metal artifact reduction.

11. The system of claim 7, wherein the initial CT image is an actual CT image of an imaging object that contains a metal implant.

12. The system of claim 7, wherein the initial CT image is simulated based, at least in part, on a phantom image.

13. The system of claim 7, wherein the feature addition circuitry is configured to extract a number, M, training patches from each of at least some of the N initial training images, the simulated training CT images generated based, at least in part, on at least some of the M training patches.

* * * * *